United States Patent
Giere et al.

(10) Patent No.: US 11,579,283 B2
(45) Date of Patent: Feb. 14, 2023

(54) IMAGING RADAR SYSTEM HAVING A RANDOM RECEIVING ARRAY FOR DETERMINING THE ANGLE OF OBJECTS IN TWO DIMENSIONS BY MEANS OF A SPREAD ARRANGEMENT OF THE RECEIVING ANTENNAS IN ONE DIMENSION

(71) Applicant: ASTYX GmbH, Ottobrunn (DE)

(72) Inventors: Andre Giere, Oberpframmern (DE); Johanna Guetlein-Holzer, Munich (DE); Sebastian Mann, Munich (DE)

(73) Assignee: CRUISE MUNICH GMBH, Ottobrunn (DE)

( * ) Notice: Subject to any disclaimer, the term of this patent is extended or adjusted under 35 U.S.C. 154(b) by 223 days.

(21) Appl. No.: 16/640,790

(22) PCT Filed: Jul. 23, 2018

(86) PCT No.: PCT/EP2018/069904
§ 371 (c)(1),
(2) Date: Feb. 21, 2020

(87) PCT Pub. No.: WO2019/037996
PCT Pub. Date: Feb. 28, 2019

(65) Prior Publication Data
US 2020/0217944 A1 Jul. 9, 2020

(30) Foreign Application Priority Data
Aug. 21, 2017 (DE) .......................... 102017214575.7

(51) Int. Cl.
*G01S 13/44* (2006.01)
*H01Q 21/06* (2006.01)
(Continued)

(52) U.S. Cl.
CPC .............. *G01S 13/44* (2013.01); *G01S 13/42* (2013.01); *G01S 13/72* (2013.01); *H01Q 21/065* (2013.01)

(58) Field of Classification Search
CPC .......... G01S 13/44; G01S 13/42; G01S 13/72; G01S 13/4445; G01S 13/931; H01Q 21/065
See application file for complete search history.

(56) References Cited

U.S. PATENT DOCUMENTS 4,980,691 A * 12/1990 Rigg ........................ H01Q 3/36
342/372
6,205,224 B1 3/2001 Underbrink
(Continued)

FOREIGN PATENT DOCUMENTS

DE 102009029503 3/2011
DE 102011113018 3/2013
(Continued)

OTHER PUBLICATIONS

DE Search Report in German Appln. No. 102017214575.7, dated Jun. 5, 2018, 13 pages (with English Translation).
(Continued)

*Primary Examiner* — Donald H B Braswell
(74) *Attorney, Agent, or Firm* — Calfee, Halter & Griswold LLP

(57) ABSTRACT

The present invention relates to an apparatus for determining the position of objects in two-dimensional space having a first dimension and a second dimension, the direction vector of which is orthogonal to the direction vector of the first dimension, containing at least one transmitter (I) having at least one transmitting antenna (3) and an imaging receiver circuit (2) having at least one receiving antenna array (Rx Array) with rows (6) of receiving antennas for scanning the first dimension by means of digital beam shaping, wherein
(Continued)

the receiving antenna array has a linear array, a sparse array or an array with an enlarged aperture, and wherein the rows (6) of receiving antennas in the receiving antenna array of the receiver circuit (2) are linearly arranged in the first dimension according to a curve function or according to the contour of a two-dimensional geometric object and are spread out in the second dimension, and to a method using the apparatus.

13 Claims, 5 Drawing Sheets

(51) Int. Cl.
*G01S 13/72* (2006.01)
*G01S 13/42* (2006.01)

(56) References Cited

U.S. PATENT DOCUMENTS

| 6,246,365 | B1 | 6/2001 | Tokoro | |
|---|---|---|---|---|
| 9,557,585 | B1* | 1/2017 | Yap | H01L 23/5226 |
| 2010/0328157 | A1 | 12/2010 | Culkin et al. | |
| 2011/0080314 | A1* | 4/2011 | Wintermantel | G01S 13/931 |
| | | | | 342/147 |
| 2011/0109495 | A1 | 5/2011 | Takeya et al. | |
| 2015/0061926 | A1* | 3/2015 | Ranney | G01S 7/414 |
| | | | | 342/25 B |
| 2017/0315221 | A1* | 11/2017 | Cohen | G01S 13/42 |

FOREIGN PATENT DOCUMENTS

| DE | 102012003 877 | 4/2013 |
|---|---|---|
| DE | 102014219113 | 3/2016 |
| DE | 102014014864 | 4/2016 |
| DE | 102015203454 | 4/2016 |

OTHER PUBLICATIONS

PCT International Preliminary Report on Patentability in International Appln. No. PCT/EP2018/069904, dated Feb. 25, 2020, 9 pages.
PCT International Search Report and Written Opinion in International Appln. No. PCT/EP2018/069904, dated Oct. 8, 2018, 11 pages.
"Request for Examination for Japanese Patent Application No. 2020-509007", Filed Date: Jun. 28, 2021, 1 Page.
"Request for Examination for Korean Patent Application No. 2020-7005610", Filed Date: Jul. 8, 2021, 1 Page.

* cited by examiner

IMAGING RADAR SYSTEM HAVING A RANDOM RECEIVING ARRAY FOR DETERMINING THE ANGLE OF OBJECTS IN TWO DIMENSIONS BY MEANS OF A SPREAD ARRANGEMENT OF THE RECEIVING ANTENNAS IN ONE DIMENSION

CROSS REFERENCE TO RELATED APPLICATIONS

This application is a National Phase entry of International Patent Application No. PCT/EP2018/069904, filed on Jul. 23, 2018, which claims priority to Application No. DE 10 2017 214 57 5.7, filed on Aug. 21, 2017, the disclosures of which are hereby incorporated by reference in their entireties.

TECHNICAL FIELD

The present invention relates to a device for determining the position of objects in two-dimensional space having a first dimension and a second dimension, the direction vector of which is orthogonal to the direction vector of the first dimension, comprising at least one transmitter having at least one transmitting antenna and an imaging receiver circuit having at least one receiving antenna array (Rx Array) having rows of receiving antennas for scanning the first dimension by means of digital beamforming.

Diverse methods of beam sweeping are currently in use in imaging radar sensor technology for automotive applications, which methods can be subdivided into three categories. They are analogue beamforming by means of a mechanical movement of the antenna, beam sweeping using analogue phase shifters, and digital beam sweeping using the principle of "digital beamforming". In this case, at least one transmitting channel and a plurality of receiving channels are required and the antenna lobe is shaped by means of phase shifts of the digitized reception signals. This technique reduces the hardware outlay in the radio-frequency frontend to a minimum and at the same time increases the reliability and flexibility of the systems. Moreover, planar antennas can be used, which permits a compact and cost-effective design of the sensors.

PRIOR ART

The use of one-dimensional digital beamforming has become established in automotive radar sensors. Disadvantageously, however, this technique does not allow conclusions to be drawn about the position of an object in two-dimensional space, but rather only a location determination in one dimension.

DE 10 2011 113 018 A1 describes the use of a plurality of transmitting channels, wherein, by means of MIMO-on-TX, the aperture is synthetically enlarged and allows the sweep angle to be increased. Furthermore, diverse methods exist for determining the position of an object in two-dimensional space, each of these methods having individual strengths and weaknesses.

Use of a fully filled two-dimensional array makes it possible to apply a beamformer over the individual rows and columns and thus to enable the two-dimensional location determination by means of a CFAR algorithm. The architecture provides for a high suppression of the sidelobes and reduces the occurrence of false alarms. The disadvantage of this architecture arises from the complex construction thereof, which considerably limits usability in automotive applications. The primary field of use of such architectures is found principally in military applications. Besides densely filled arrays, so-called "sparse arrays" are also used, in which rows of antennas in the two-dimensional receiving array are deliberately omitted. In this implementation, the routing outlay is significantly reduced at the expense of reduced sidelobe suppression. Furthermore, use is made of less complex architectures with a so-called amplitude monopulse. The two-dimensional beamforming arises from two transmitting antennas and a receiving array, wherein the transmitting antennas have a tilted antenna pattern with respect to one another. The location determination in the second dimension then results from the antenna patterns and also the amplitude comparison of the reception signals. This method has the disadvantage, however, that it requires complex, individual calibration of the radar sensors since in some instances severe distortions of the directivity patterns of the antennas can occur as a result of the type of installation position and covering in an automobile.

This problem is avoided with the use of a phase monopulse, cf. DE 10 2014 014 864 A1. The architecture here is constructed analogously to the architecture in the case of an amplitude monopulse. Rather than the amplitude, however, the phase difference between the reception signals of the two virtual receiving arrays is evaluated in the signal processing. In addition to the methods described above, it is furthermore possible to implement a location determination on the basis of a known beam characteristic of Tx and/or Rx antennas.

Disadvantageously here use is made of one or alternatively a plurality of transmitting antennas and also a plurality of receiving antenna arrays each having a plurality of rows of receiving antennas which results in a considerable space requirement and routing outlay and, not least, crucially influences the costs of the system. Therefore, it is desirable to minimize the number of rows of receiving antennas without losses in functionality.

DESCRIPTION OF THE INVENTION

Therefore, the problem addressed by the present invention is that of providing an improved device and method for the non-contact determination of the position of one or more objects in space by means of an imaging radar sensor using digital beamforming.

This problem is solved according to the invention by means of a device as claimed in claim 1 and a method as claimed in claim 11.

The basic concept of the present invention is that the receiving antenna array has a linear array, a sparse array or an array with an enlarged aperture, wherein the rows of receiving antennas of the receiving antenna array of the receiver circuit are arranged linearly in the first dimension in accordance with a curve function or in accordance with the contour of a two-dimensional geometric object and are spread out in the second dimension.

The invention is distinguished here by the fact that it is possible to carry out digital beamforming for determining the location of objects in conjunction with small sidelobes in both dimensions. Said small sidelobes make it possible to ensure a low false alarm rate in the application.

Particularly advantageously here use is made of a receiving antenna array arrangement that is arranged linearly in the first dimension in such a way that a second transmitting antenna or alternatively a second receiving antenna array is not necessarily required for location determination in the second dimension. The field of use of the millimeter-wave radar sensor described is principally focused on automotive applications, resulting in requirements made of the sensor which concern, inter alia, the sensor's size, distance and angle resolution in azimuth and elevation and also the necessary update rate and thus the maximum duration of an individual measurement. At the same time, a high reliability is made possible since the sensor system must be able to identify obstacles without delay and to make available to the automobile relevant data such as the position and extent of said obstacles. Advantageously here use is made of one or alternatively a plurality of transmitting antennas and also a plurality of receiving antenna arrays each having a plurality of rows of receiving antennas which results in a considerable space requirement and routing outlay and, not least, crucially influences the costs of the system. Therefore, the aim is to minimize the number of rows of receiving antennas without losses in functionality.

Preferably, the rows of receiving antennas of the receiver circuit are arranged as a straight line, triangle, sawtooth, or sinusoidally in the first dimension. Alternatively, the rows of receiving antennas of the receiver circuit are arranged as a rectangle, circle, or ellipse in the first dimension.

Advantageously, the receiving antenna array (Rx-Array) described is a linear array, a sparse array, or an array of large aperture and arbitrarily positioned antennas. In this case, the arrangement of the individual rows of receiving antennas is effected with the aid of an arbitrary curve function, e.g. a straight line, a triangle, a sawtooth, a sine function, or alternatively on the open or closed contour of an arbitrary two-dimensional geometric object, such as e.g. a rectangle, a triangle (with an open contour: V-shape), a circle (with an open contour: circle arc) or an ellipse, wherein in each case the orientation of the first and second dimensions is predefined and the array is spread out in the second dimension. As a result of the array being spread out in a second dimension, the array described makes it possible, without a further receiving antenna array, simultaneously to obtain information about the positioning of the object in two-dimensional space in conjunction with small sidelobes.

Preferably, the phase centers of the rows of receiving antennas of the receiver circuit are arranged in a non-regular pattern in the second dimension.

The rows of receiving antennas are thus spread out in a non-regular pattern and the number of different discrete positions in the second dimension of the rows of receiving antennas (6) $N_{Pos,2D}$ is at least three, but preferably $N_{Pos,2D} \geq \sqrt{N_{RxANT}}$, the number of rows of receiving antennas used overall being given by $N_{RxANT}$. In order to simplify the positioning, a random function can be used, the spacing of the maximum deviation from the mean value in the second dimension being predefined.

Preferably, the real receiving antenna array (Rx ANT) of the receiver circuit is able to be enlarged by at least two switchable transmitting antennas by means of MIMO-on-Tx to form a virtual receiving antenna array (Rx Virt) having a number of virtual elements $N_{RxVirt} > N_{RxANT}$.

In this case, in the second dimension the phase centers of the transmitting antennas are identical, or, additionally or alternatively, in the second dimension the phase centers of the transmitting antennas are different and an additional offset is formed in the virtual receiving antenna array (Rx Virt) as a result.

Consequently, the device can be used not only for radar systems with one transmitter and a single transmitting antenna, but advantageously also in radar systems with so-called MIMO-on-TX. The latter denotes the extension of a real receiving array to form a virtual array by the use of at least two or more switchable transmitting antennas. The number of virtual elements $N_{RxVirt} > N_{RxANT}$ results from the arrangement of the transmitting antennas with respect to the receiving channels. Various possibilities for the arrangement of the transmitting antennas arise here. Firstly, the transmitting antennas can be arranged in such a way that in the second dimension they have no offset with respect to one another and accordingly do not cause additional spreading of the virtual receiving array. Alternatively or additionally, however, it is also possible to utilize further transmitting antennas actively for additional spreading of the receiving array by means of an offset in the second dimension. By means of various signal processing methods, an improvement of the beamforming in at least one direction can be achieved for both embodiments of the device as hardware variants.

The receiving antenna array of the receiver circuit is thus enlarged using at least two switchable transmitting antennas by means of MIMO-on-Tx to form a virtual array having a number of virtual elements $N_{RxVirt} > N_{RxANT}$, in particular with identical phase centers of the transmitting antennas in the second dimension, or with different phase centers of the transmitting antennas in the second dimension, with the result that an additional offset is generated in the virtual receiving array, or, under the assumption of more than two transmitting antennas, by means of a combination of both variants.

Besides an improvement of the focusing in the first dimension, i.e. a narrower antenna lobe in the main beam direction, what is also achieved, as a result of the aperture being enlarged, is an improvement of the grating lobes by means of the switching of the transmitting antennas using half-row SAR.

An improvement in the second dimension results from the fact that additional spreading is achieved as a result of an offset of the transmitting antennas in the second dimension and the beamforming in this dimension thus leads to a narrower lobe. A higher number of transmitting antennas with at the same time an offset in the second dimension can thus result in an improvement of the characteristics in both dimensions.

Preferably, the device described is suitable for use in a frequency-modulated CW radar method, in digitally modulated radar and/or in a pulse radar.

Preferably, the number of rows of receiving antennas is $N_{RxANT} \geq 4$.

Preferably, the at least one transmitting antenna and the imaging receiver circuit are operable in the frequency range of 1 GHz to 300 GHz, preferably in the frequency range of 20 GHz to 160 GHz, particularly preferably in the frequency range of 76 GHz to 81 GHz.

The effectiveness of the improvements to be achieved by the spreading of the receiving antennas is therefore independent of the basic form and likewise independent of the radar method used. On account of the field of use in automotive radar applications, the described device and also the method are primarily provided for the frequency band of 76-81 GHz, but are not limited to this frequency range. Fundamental usability is afforded in the complete centimeter- and millimeter-wave range in the range of 1 GHz to 300 GHz, but is not restricted to a concretized frequency range.

The method according to the invention for determining the position of objects in two-dimensional space having a first dimension and a second dimension, using the device described, comprises the following steps:

transmitting a radar signal by means of at least one transmitting antenna;

receiving a signal by means of an imaging receiver circuit having at least one receiving antenna array (Rx Array) for scanning the first dimension;

digitizing the signal data;

carrying out a range FFT and/or a velocity FFT and digital beamforming;

object detection and position determination.

The signal processing, underlying the method, for calculating the two-dimensional target position is illustrated in FIG. 4 in the form of a signal flow diagram for the example of an FMCW radar. After the measurement, that is to say the transmission, reception and digitization of a ramp, the basis for the subsequent digital beamforming is firstly established by means of a range FFT and a velocity FFT. The target detection is carried out firstly in the first dimension, e.g. by means of an OSCFAR or a Peak search function, followed by beamforming in the second dimension on the basis of the FFT data at the positions of the targets previously found in the first dimension. The further position determination in the second dimension is carried out as described below. Finally, the two-dimensional data of the so-called range-velo cells are calculated from the combination of both beamformers.

Preferably, the object detection is carried out in the first dimension and the position determination is carried out in the second dimension.

The target detection in the second dimension is carried out by digital beamforming over the elements distributed irregularly in this dimension, wherein the lobe width attained is substantially defined by the standard deviation of the random distribution. In addition, moreover, an amplitude monopulse can be employed.

Preferably, upon successful object detection in the first dimension, the position determination is subsequently carried out with beamforming for a plurality of beams in the second dimension.

Preferably, upon successful object detection in the first dimension, the position determination is subsequently carried out with beamforming and an amplitude monopulse for a plurality of beams in the second dimension.

Preferably, when the rows of receiving antennas of the receiving antenna array are arranged in accordance with a curve function, the position determination is subsequently carried out with 2D beamforming on the basis of the phase centers.

One embodiment of the device and of the method is explained in greater detail below with reference to the drawing, without any desire for the invention thereby to be restricted.

In the embodiment described, the arrangement can be described by means of a Cartesian coordinate system; the direction vectors of the two dimensions are orthogonal to one another.

Figure 1:
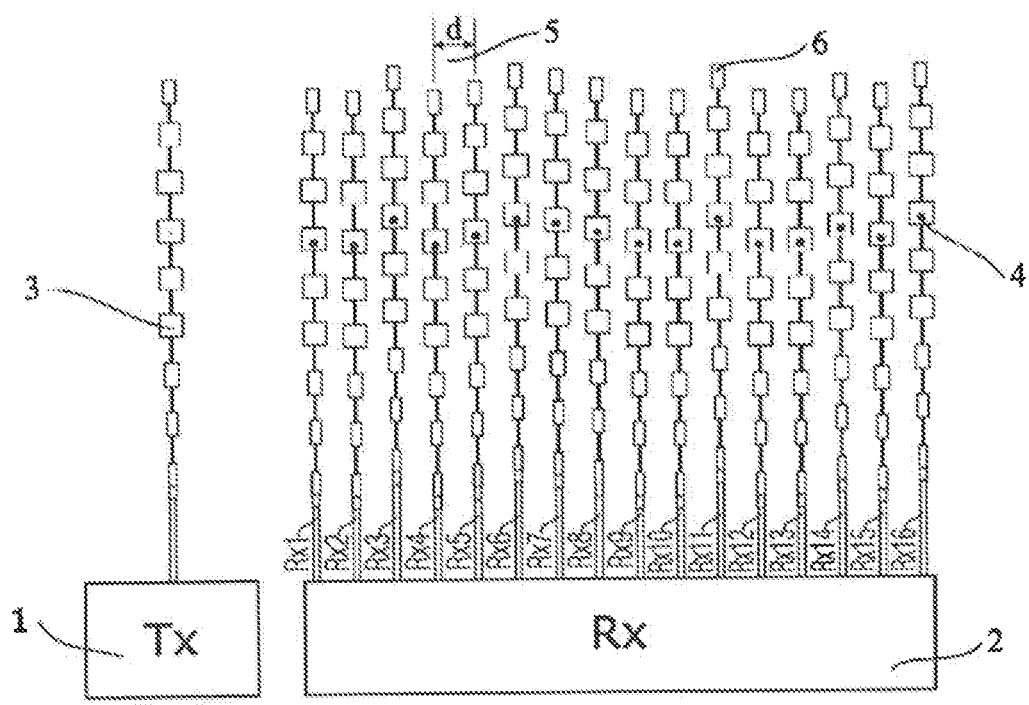
FIG. 1 shows a front end having 16 Rx antennas and one Tx antenna. Arrangement of the Rx antennas in the 2nd dimension by rand( )*Max. deviation.

FIG. 1 shows such an exemplary implementation of a radar front end consisting of a transmitter (1) having a transmitting antenna (3) and a receiver circuit (2) having 16 rows of receiving antennas (6), wherein the rows of receiving antennas (6) are oriented linearly on a straight line along the first dimension. The array is spread out in the second dimension, which is orthogonal to the first dimension, with the aid of a random function. The associated positions of the linear array having the row spacing 2200 µm in the first dimension and randomly determined positions in the second dimension are presented in table 1:

| Dim 1 (µm) | Dim 2 (µm) | |
|---|---|---|
| −1260 | 0 | Rx1 |
| −1620 | 2200 | Rx2 |
| 1490 | 4400 | Rx3 |
| −1650 | 6600 | Rx4 |
| −530 | 8800 | Rx5 |
| 1610 | 11 000 | Rx6 |
| 890 | 13 200 | Rx7 |
| −190 | 15 400 | Rx8 |
| −1830 | 17 600 | Rx9 |
| −1860 | 19 800 | Rx10 |
| 1370 | 22 000 | Rx11 |
| −1880 | 24 200 | Rx12 |
| −1830 | 26 400 | Rx13 |
| 60 | 28 600 | Rx14 |
| −1200 | 30 800 | Rx15 |
| 1430 | 33 000 | Rx16 |

Table 1: Positioning of the rows of receiving antennas of the array illustrated in FIG. 1 with a linear arrangement in dimension 1 with a row spacing of 2200 µm and a randomly produced arrangement of the antennas in dimension 2.

Figure 2:
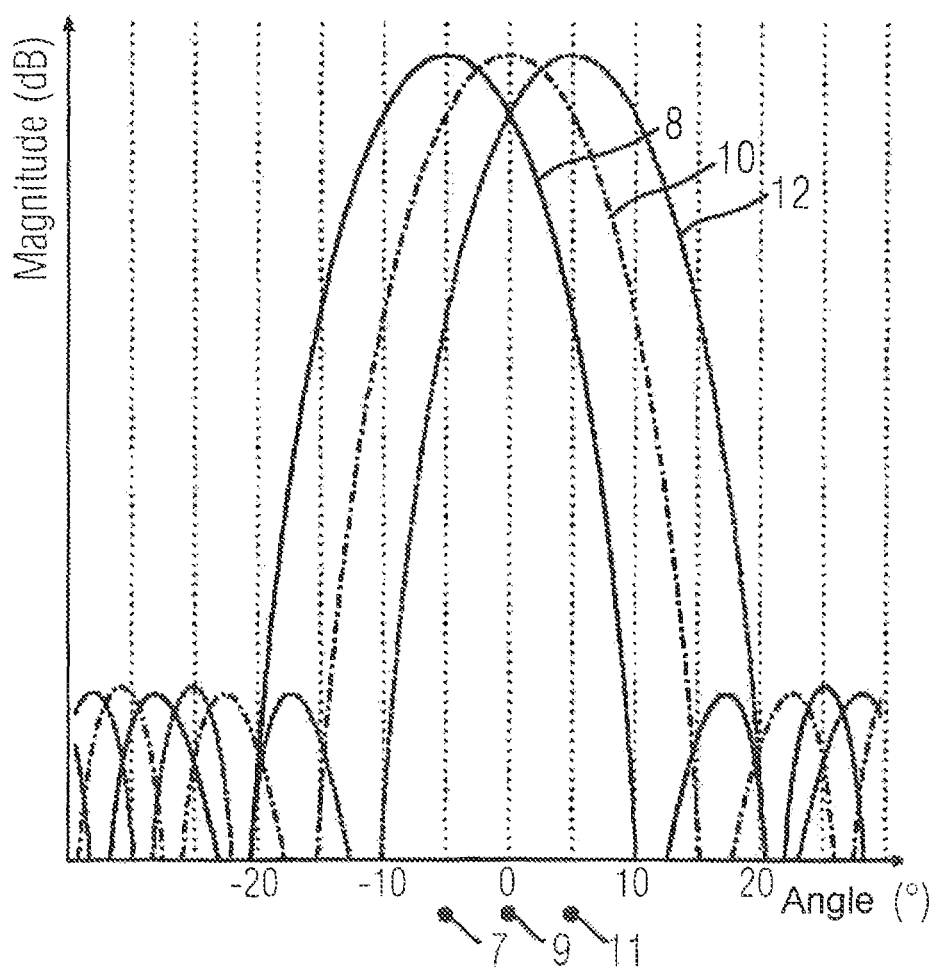
FIG. 2 shows an antenna pattern in the $2^{nd}$ dimension with three shaped beams by virtue of different positionings of the phase center in the $2^{nd}$ dimension.

FIG. 2 shows three resulting beams in the second dimension for the front end having one transmitter and 16 receiving channels as illustrated in FIG. 1. In this case, the spreading of the position of the phase center results in an angle offset of the viewing direction of the beams and thus also allows an evaluation in the second dimension. In this case, the maximum deviation of the spreading from the mean value must be defined in such a way that for a finite number of receiving rows, the beamforming in the first dimension is not critically influenced.

Figure 3:
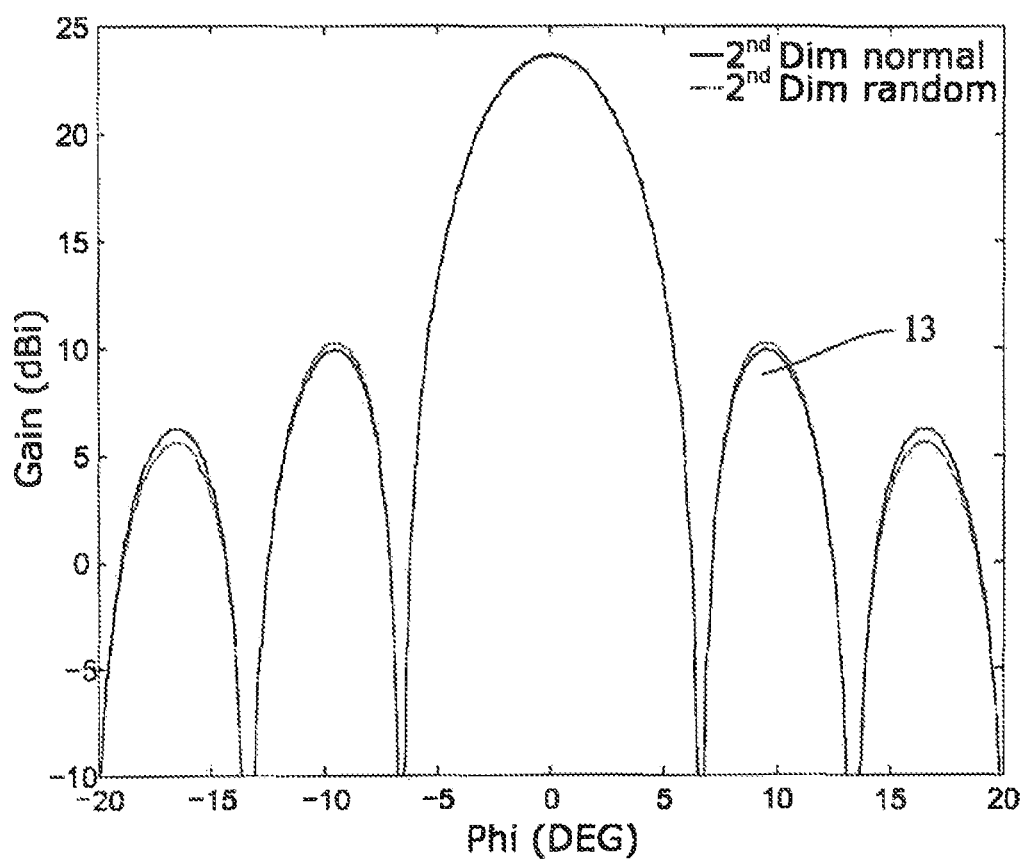
FIG. 3 shows an antenna pattern in the first dimension for the antenna positions listed in table 1 ($1^{st}$ dim. linear, $2^{nd}$ dimension randomly generated) and for a linear array of the antenna positions without a deviation in the second dimension.

FIG. 3 shows by way of example the antenna pattern produced by digital beamforming for a main beam direction of 0° in a comparison between a linear array without and with a spread-out second dimension. It is evident here that the effects of the spreading in the second dimension are manifested only marginally in the antenna pattern, principally at the sidelobes.

Figure 4:
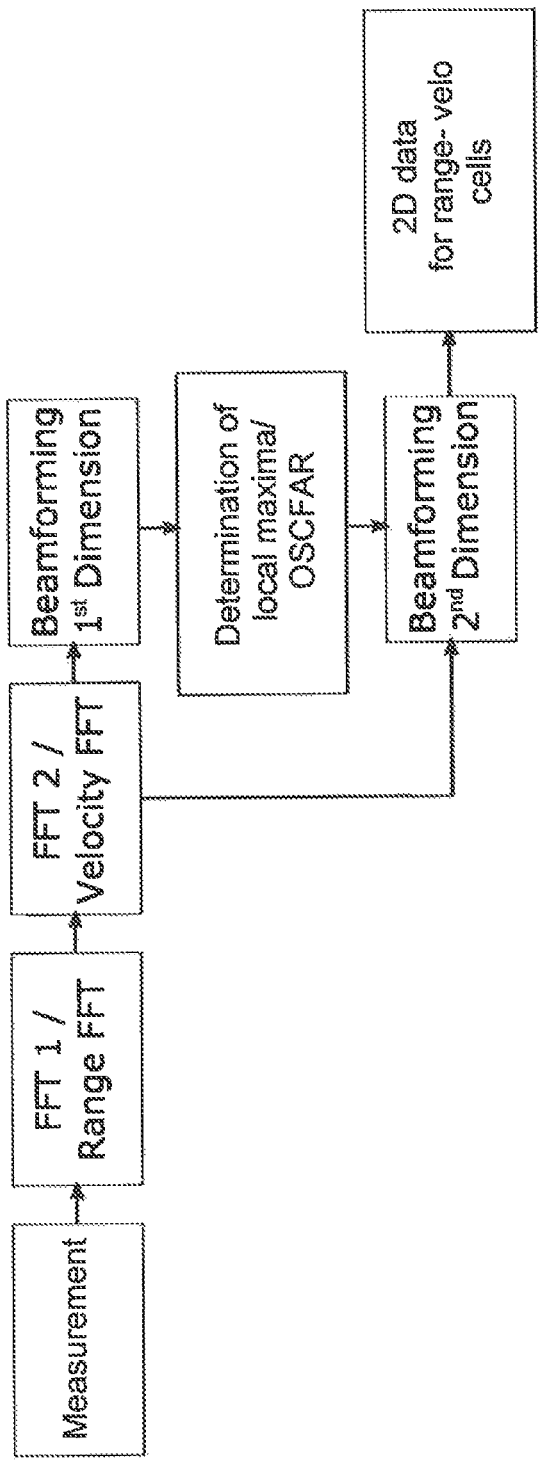
FIG. 4 shows a signal flow diagram of the 2D location determination with the use of FMCW.

FIG. 4 shows the signal processing for calculating the two-dimensional target position in the form of a signal flow diagram on the basis of the example of an FMCW radar. After the measurement, that is to say the transmission, reception and digitization of a ramp, the basis for the subsequent digital beamforming is firstly established by means of a range FFT and a velocity FFT. The target detection is carried out firstly in the first dimension, e.g. by means of an OSCFAR or a Peak search function, followed by beamforming in the second dimension on the basis of the FFT data at the positions of the targets previously found in the first dimension. The further position determination in the second dimension is carried out as described above. Finally, the two-dimensional data of the so-called range-velo cells are calculated from the combination of both beamformers.

Figure 5:
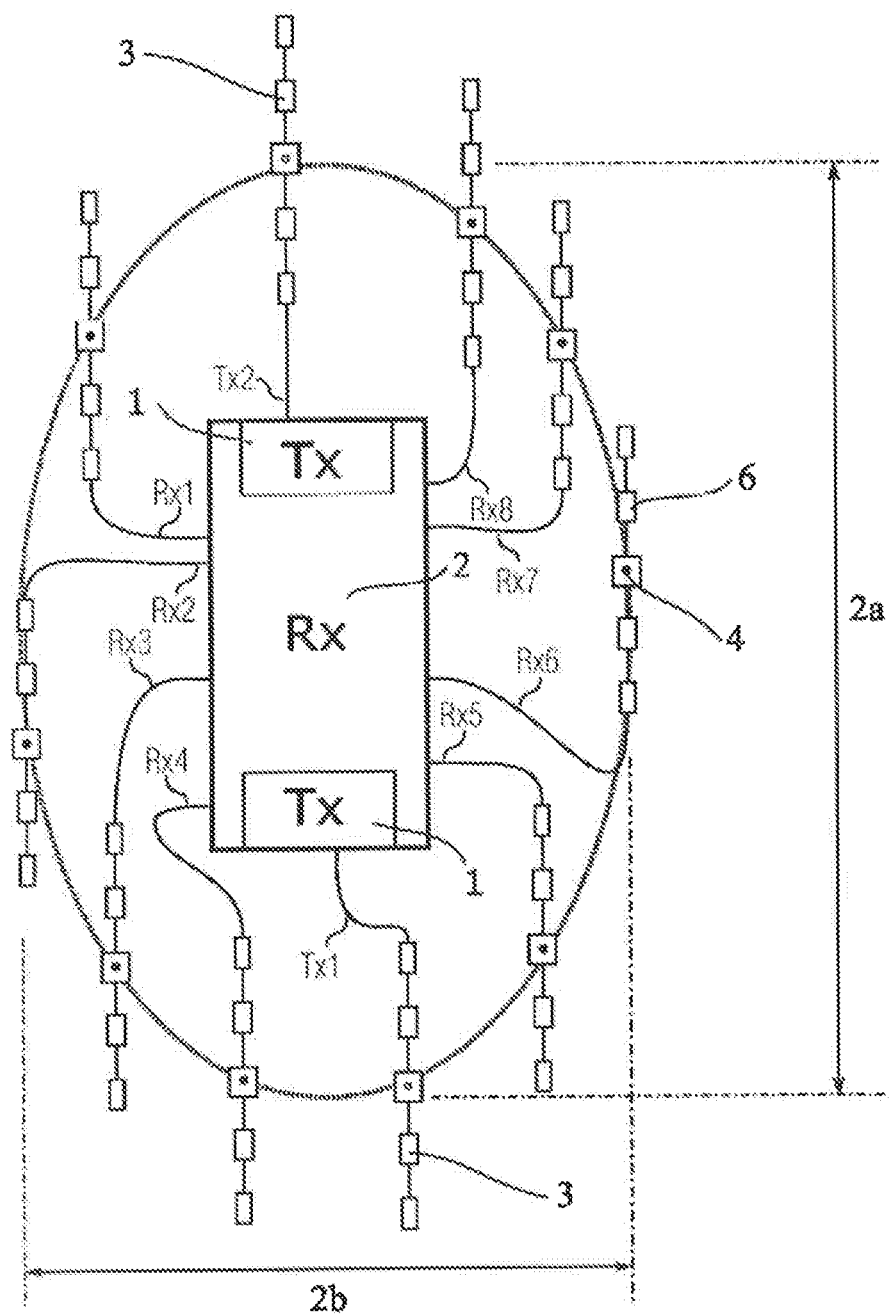
FIG. 5 shows an elliptic array arrangement having 2 Tx and 8 Rx.

FIG. 5 illustrates an exemplary arrangement of a MIMO-on-TX radar system based on an elliptic arrangement of the antennas. In the arrangement shown, the phase centers of the eight rows of receiving antennas (6) lie on the contour of the ellipse described by the angle-dependent radius r thereof:

$$r(\vartheta)^2 = \frac{a^2 b^2}{a^2 \sin(\vartheta) + b^2 \cos(\vartheta)},$$

wherein the maximum radius is defined by a and the minimum radius of the ellipse is defined by b. In the arrangement shown, here the radius forms the first dimension, the random distribution being applied to the angle, which accordingly represents the second dimension. The MIMO-on-TX is made possible by means of two switchable transmitting antennas (3), which are positioned in different positions relative to the ellipse.

REFERENCE SIGNS

1 Transmitter
2 Receiver circuit
3 Transmitting antenna
4 Phase center
5 Row spacing
6 Row of receiving antennas
7 Viewing direction (deviation 1)
8 Directivity characteristic dim. 2 (deviation 1)
9 Viewing direction (deviation 2)
10 Directivity characteristic dim. 2 (deviation 2)
11 Viewing direction (deviation 3)
12 Directivity characteristic dim. 2 (deviation 3)
13 Sidelobes

The invention claimed is:

1. A device for determining the position of objects in two-dimensional space having a first dimension and a second dimension, a direction vector of the first dimension is orthogonal to a direction vector of the second dimension, the device comprising:
at least one transmitter having at least one transmitting antenna, and
an imaging receiver circuit having at least one receiving antenna array having rows of receiving antennas for scanning the first dimension through digital beamforming, wherein the receiving antenna array has a linear array, a sparse array or an array with an enlarged aperture, and wherein the rows of receiving antennas of the receiving antenna array of the receiver circuit are arranged linearly in the first dimension in accordance with a curve function or in accordance with the contour of a two-dimensional geometric object and are arranged in the second dimension by a random function, wherein a number of discrete positions $N_{Pos,2D}$ in the second dimension is defined by a number of rows of receiving antennas $N_{RxANT}$ in accordance with $N_{Pos,2D} \geq \sqrt{N_{RxANT}}$, and further wherein the number of discrete positions in the second dimension is at least 3.

2. The device as claimed in claim 1, wherein the rows of receiving antennas of the receiver circuit are arranged as a straight line, triangle, sawtooth, or sinusoidally in the first dimension, or wherein the rows of receiving antennas of the receiver circuit are arranged as a rectangle, circle, or ellipse in the first dimension.

3. The device as claimed in claim 1, wherein phase centers of the rows of receiving antennas of the receiver circuit are arranged in a non-regular pattern in the second dimension.

4. The device as claimed in claim 1, wherein the receiving antenna array of the receiver circuit is able to be enlarged by at least two switchable transmitting antennas through multiple input multiple output on transmissions (MIMO-on-Tx) to form a virtual receiving antenna array having a number of virtual elements $N_{RxVirt} > N_{RxANT}$.

5. The device as claimed in claim 4, wherein in the second dimension phase centers of the transmitting antennas are identical, or
wherein in the second dimension the phase centers of the transmitting antennas are different and an additional offset is formed in the virtual receiving antenna array.

6. A radar comprising the device as claimed in claim 1, wherein the radar is selected from the group consisting of a frequency-modulated CW radar, a digitally modulated radar, and a pulse radar.

7. The device as claimed in claim 1, wherein the number of rows of receiving antennas is at least 4.

8. The device as claimed in claim 1, wherein the at least one transmitting antenna and the imaging receiver circuit are operable in a frequency range of 1 GHz to 300 GHz.

9. A method for determining the position of objects in two-dimensional space having a first dimension and a second dimension, using a device as claimed in claim 1, the method comprising:
transmitting a radar signal using the at least one transmitting antenna,
receiving a signal using the imaging receiver circuit having the at least one receiving antenna array for scanning the first dimension,
digitizing the signal data,
carrying out a range fast Fourier transform (FFT) and/or a velocity FFT and digital beamforming;
detecting an object and determining a position of the object.

10. The method as claimed in claim 9, wherein the object is detected with respect to the first dimension and the position of the object is determined with respect to the second dimension.

11. The method as claimed in claim 9, wherein upon successful detection of the object in the first dimension, the position of the object is subsequently determined using beamforming for a plurality of beams in the second dimension.

12. The method as claimed in claim 9, wherein upon successful detection of the object in the first dimension, the position of the object is subsequently determined using beamforming and an amplitude monopulse for a plurality of beams in the second dimension.

13. The method as claimed in claim 9, wherein when the rows of receiving antennas of the receiving antenna array are arranged in accordance with a curve function, the position of the object is subsequently determined using two-dimensional (2D) beamforming on the basis of phase centers of the rows of receiving antennas of the receiver circuit.

* * * * *